(12) United States Patent
Sandhu et al.

(10) Patent No.: US 7,565,039 B2
(45) Date of Patent: Jul. 21, 2009

(54) RESISTIVE HEATER FOR THERMO OPTIC DEVICE

(75) Inventors: Gurtej Singh Sandhu, Boise, ID (US); Guy T. Blalock, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/929,210

(22) Filed: Aug. 30, 2004

(65) Prior Publication Data

US 2005/0031263 A1    Feb. 10, 2005

Related U.S. Application Data

(62) Division of application No. 10/231,898, filed on Aug. 29, 2002, now Pat. No. 7,020,365.

(51) Int. Cl.
G02F 1/295    (2006.01)
G02B 6/34    (2006.01)

(52) U.S. Cl. ................. 385/10; 385/8; 385/37

(58) Field of Classification Search ............ 385/8, 385/10, 37, 45; 216/27
See application file for complete search history.

(56) References Cited

U.S. PATENT DOCUMENTS

| | | | |
|---|---|---|---|
| 4,166,669 A | 9/1979 | Leonberger et al. | |
| 4,518,219 A | 5/1985 | Leonberger et al. | |
| 4,592,043 A | 5/1986 | Williams | |
| 4,616,898 A | 10/1986 | Hicks, Jr. | |
| 4,665,421 A | 5/1987 | Borner et al. | |
| 4,799,749 A * | 1/1989 | Borner et al. | 385/14 |
| 4,859,017 A | 8/1989 | Brierley et al. | |
| 4,886,538 A | 12/1989 | Mahapatra | |
| 5,155,620 A | 10/1992 | Gordon et al. | |
| 5,408,568 A | 4/1995 | Hamilton | |
| 5,639,386 A * | 6/1997 | Burke et al. | 216/27 |
| 5,710,849 A | 1/1998 | Little et al. | |
| 5,784,400 A | 7/1998 | Joannopoulos et al. | |
| 5,838,845 A | 11/1998 | Leone et al. | |
| 5,841,931 A | 11/1998 | Foresi et al. | 385/131 |
| 5,915,051 A | 6/1999 | Damask et al. | |
| 5,987,196 A | 11/1999 | Noble | 385/14 |

(Continued)

OTHER PUBLICATIONS

Damask, Jay N., "Integrated-Optic Grating-Based Filters for Optical Communication Systems", Doctoral Thesis, Department of Electrical Engineering, Massachusetts Institute of Technology, (May 6, 1996), 143-183.

(Continued)

Primary Examiner—Frank G. Font
Assistant Examiner—Mary El-Shammaa
(74) Attorney, Agent, or Firm—Schwegman, Lundberg & Woessner, P.A.

(57) ABSTRACT

Resistive heaters formed in two mask counts on a surface of a grating of a thermo optic device thereby eliminating one mask count from prior art manufacturing methods. The resistive heater is comprised of a heater region and a conductive path region formed together in a first mask count from a relatively high resistance material. A conductor formed from a relatively low resistance material is formed directly on the conductive path region in a second mask count. Thermo optic devices formed by these two mask count methods are also described.

32 Claims, 10 Drawing Sheets

U.S. PATENT DOCUMENTS

| | | | |
|---|---|---|---|
| 6,035,089 A | 3/2000 | Grann et al. | |
| 6,052,495 A | 4/2000 | Little et al. | 385/2 |
| 6,090,636 A | 7/2000 | Geusic et al. | 438/31 |
| 6,097,865 A | 8/2000 | Alferness et al. | |
| 6,101,300 A | 8/2000 | Fan et al. | |
| 6,108,464 A | 8/2000 | Foresi et al. | 385/14 |
| 6,144,779 A * | 11/2000 | Binkley et al. | 385/8 |
| 6,150,188 A | 11/2000 | Geusic et al. | 438/31 |
| 6,219,366 B1 | 4/2001 | Furushima | |
| 6,278,168 B1 * | 8/2001 | Day | 257/431 |
| 6,311,004 B1 | 10/2001 | Kenney et al. | |
| 6,396,988 B1 | 5/2002 | Shimoda | |
| 6,411,752 B1 | 6/2002 | Little et al. | |
| 6,433,919 B1 | 8/2002 | Chowdhury et al. | |
| 6,453,377 B1 | 9/2002 | Farnworth et al. | 710/300 |
| 6,465,269 B2 | 10/2002 | Furushima | |
| 6,519,658 B2 | 2/2003 | Farnworth et al. | 710/13 |
| 6,522,812 B1 | 2/2003 | Nikonov | 385/37 |
| 6,526,191 B1 | 2/2003 | Geusic et al. | 385/14 |
| 6,532,326 B1 | 3/2003 | Hutchinson et al. | |
| 6,567,573 B1 | 5/2003 | Domash et al. | |
| 6,571,039 B1 | 5/2003 | Al-hemyari et al. | |
| 6,573,813 B1 | 6/2003 | Joannopoulos et al. | 333/249 |
| 6,748,138 B2 | 6/2004 | Wang et al. | |
| 6,865,314 B1 | 3/2005 | Blair et al. | |
| 6,913,705 B2 | 7/2005 | Nakata | |
| 6,950,581 B2 | 9/2005 | Bandyopadhyay | |
| 6,975,798 B2 | 12/2005 | Blauvelt et al. | |
| 6,995,441 B2 | 2/2006 | Geusic et al. | |
| 7,003,205 B2 | 2/2006 | Cho et al. | |
| 7,006,746 B2 | 2/2006 | Blalock et al. | |
| 7,020,365 B2 | 3/2006 | Sandhu et al. | |
| 7,116,876 B2 | 10/2006 | Jang et al. | |
| 7,120,336 B2 | 10/2006 | Sandhu et al. | |
| 7,120,341 B2 | 10/2006 | Oh et al. | |
| 7,215,838 B2 | 5/2007 | Sandhu et al. | |
| 7,323,353 B2 | 1/2008 | Sandhu et al. | |
| 7,359,607 B2 | 4/2008 | Blalock et al. | |
| 2001/0026670 A1 | 10/2001 | Takizawa et al. | |
| 2001/0046363 A1 | 11/2001 | Purchase et al. | |
| 2002/0018634 A1 | 2/2002 | Korenaga et al. | |
| 2002/0186920 A1 | 12/2002 | Viens et al. | 385/27 |
| 2002/0191520 A1 | 12/2002 | Nagata et al. | |
| 2003/0026575 A1 | 2/2003 | Lempkowski | |
| 2003/0048746 A1 | 3/2003 | Guess et al. | |
| 2003/0061836 A1 | 4/2003 | Higuchi et al. | |
| 2003/0169964 A1 | 9/2003 | Wang et al. | 385/27 |
| 2003/0174945 A1 | 9/2003 | Fried et al. | 385/37 |
| 2003/0174946 A1 | 9/2003 | Viens | 385/37 |
| 2003/0174956 A1 | 9/2003 | Viens | 385/43 |
| 2003/0197186 A1 | 10/2003 | Geusic | 257/80 |
| 2003/0202548 A1 | 10/2003 | Andersen et al. | |
| 2004/0001665 A1 | 1/2004 | Zoorob | |
| 2004/0008959 A1 | 1/2004 | Haase et al. | |
| 2004/0037341 A1 | 2/2004 | Tan et al. | |
| 2004/0091198 A1 | 5/2004 | Graves | |
| 2004/0114899 A1 | 6/2004 | Mattsson | |
| 2005/0025424 A1 | 2/2005 | Sandhu et al. | |
| 2005/0031284 A1 | 2/2005 | Blalock et al. | |
| 2006/0098911 A1 | 5/2006 | Sandhu et al. | |
| 2006/0228084 A1 | 10/2006 | Sandhu et al. | |
| 2006/0263027 A1 | 11/2006 | Sandhu et al. | |
| 2008/0089647 A1 | 4/2008 | Sandhu et al. | |
| 2008/0226247 A1 | 9/2008 | Blalock et al. | |

OTHER PUBLICATIONS

"U.S. Appl. No. 10/231,897 Non-final office action mailed Oct. 5, 2004", 22 pgs.

"U.S. Appl. No. 10/231,897 Notice of allowance mailed Jan. 18, 2006", 9 pgs.

"U.S. Appl. No. 10/231,897 Notice of allowance mailed Jun. 15, 2005", 9 pgs.

"U.S. Appl. No. 10/231,897 Notice of allowance mailed Jun. 16, 2006", 8 pgs.

"U.S. Appl. No. 10/231,897 Notice of allowance mailed Oct. 3, 2005", 8 pgs.

"U.S. Appl. No. 10/231,897 Response filed Mar. 7, 2005 to Non-final office action mailed Oct. 5, 2004", 19 pgs.

"U.S. Appl. No. 10/231,898 Amendment and response filed May 2, 2005 to Final office action mailed Dec. 1, 2004", 9 pgs.

"U.S. Appl. No. 10/231,898 Final office action mailed Dec. 1, 2004", 6 pgs.

"U.S. Appl. No. 10/231,898 Non-final office action mailed Apr. 23, 2004", 7 pgs.

"U.S. Appl. No. 10/231,898 Notice of allowance mailed Jun. 6, 2005", 8 pgs.

"U.S. Appl. No. 10/231,898 Notice of allowance mailed Oct. 26, 2005", 7 pgs.

"U.S. Appl. No. 10/231,898 Response filed Aug. 23, 2004 to Non-final office action mailed Apr. 23, 2004", 9 pgs.

"U.S. Appl. No. 10/233,000 Non-final office action mailed Oct. 13, 2004", 15 pgs.

"U.S. Appl. No. 10/233,000 Notice of allowance mailed Jun. 10, 2005", 9 pgs.

"U.S. Appl. No. 10/233,000 Notice of allowance mailed Oct. 6, 2005", 7 pgs.

"U.S. Appl. No. 10/233,000 Response filed Mar. 14, 2005 to Non-final office action mailed Oct. 13, 2004", 12 pgs.

"U.S. Appl. No. 10/929,271 Amendment and Response filed Jun. 11, 2007 to Final office action mailed Apr. 9, 2007", 21 pgs.

"U.S. Appl. No. 10/929,271 Amendment and Response filed Aug. 30, 2006 to Final office action mailed Jul. 18, 2006", 17 pgs.

"U.S. Appl. No. 10/929,271 Final office action mailed Apr. 9, 2007", 31 pgs.

"U.S. Appl. No. 10/929,271 Final office action mailed Jul. 18, 2006", 17 pgs.

"U.S. Appl. No. 10/929,271 Non-final office action mailed Mar. 21, 2006", 12 pgs.

"U.S. Appl. No. 10/929,271 Non-final office action mailed Jul. 13, 2007", 38 pgs.

"U.S. Appl. No. 10/929,271 Response filed Jun. 19, 2006 to Non-final office action mailed Mar. 21, 2006", 13 pgs.

"U.S. Appl. No. 10/929,904 Non-final office action mailed Feb. 8, 2006", 8 pgs.

"U.S. Appl. No. 10/929,904 Notice of allowance mailed Jan. 10, 2007", 9 pgs.

"U.S. Appl. No. 10/929,904 Response filed May 8, 2006 to Non-final office action mailed Feb. 8, 2006", 11 pgs.

"U.S. Appl. No. 11/424,401 Non-final office action mailed Nov. 29, 2006", 11 pgs.

"U.S. Appl. No. 11/424,401 Notice of allowance mailed Jun. 25, 2007", 12 pgs.

"U.S. Appl. No. 11/424,401 Response filed Feb. 28, 2007 to Non-final office action mailed Nov. 29, 2006", 12 pgs.

"Non-Final Office Action Mailed Jul. 13, 2007 in U.S. Appl. No. 10/929,271", OARN, 38 pgs.

"Notice of Allowance Mailed Sep. 5, 2007 in U.S. Appl. No. 11/493,717", NOAR, 8.

* cited by examiner

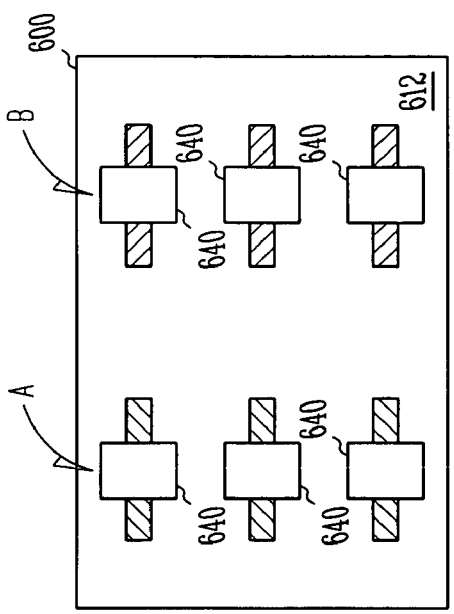
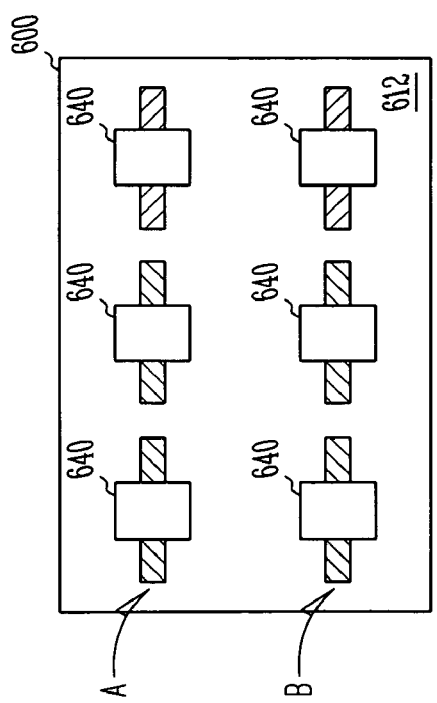
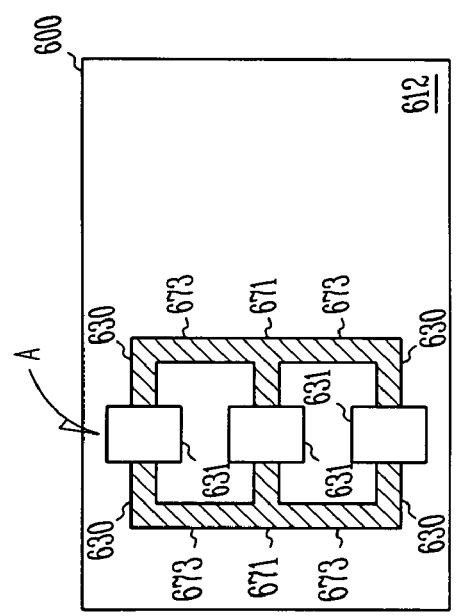

RESISTIVE HEATER FOR THERMO OPTIC DEVICE

This application is a Divisional of U.S. application Ser. No. 10/231,898, filed Aug. 29, 2002, now U.S. Pat. No. 7,020,365, which is incorporated herein by reference.

FIELD OF THE INVENTION

The present invention relates to thermo optic devices, such as optical waveguides. In particular, it relates to a resistive heater for changing an optical characteristic of the thermo optic device. Even more particularly, it relates to an efficiently formed resistive heater.

BACKGROUND OF THE INVENTION

The art of making and developing new uses for thermo optic devices continues to emerge. Presently, thermo optic devices are used as filters, switches, multiplexers, waveguides, and a host of other semiconductor and optical transmission devices.

With reference to FIGS. 1A and 1B, a thermo optic device in accordance with the prior art is shown generally as 110. It comprises a cladding 115 that includes an upper cladding 114 and a lower cladding 112. A core 116 is defined by the cladding and is generally formed of a material having a higher or lower refractive index than that of the cladding. The core 116 may, for example, define an optical waveguide, such as a Y-shaped optical splitter having an input waveguide 122 and two output waveguides 124, 126. The core 116 together with the cladding 115 are sometimes referred to as a grating and are disposed on a substrate 118. The substrate may be formed of silicon but is not required to be. A heater 120 is disposed adjacent to the cladding 115.

During use, a control element (not shown) delivers current to the heater 120, to change an optical characteristic of the thermo optic device. For example, in a Bragg grating formed with a polymer grating, when current is delivered to heater 120, the refractive index of the polymer will change as a result of the thermo optic effect. In turn, this refractive index change affects the wavelength of light that satisfies the known Bragg reflective condition so that a different wavelength is now Bragg reflected in the optical waveguide.

If the process is repeated at another temperature, which is a function of current delivery and heater characteristics, another wavelength will satisfy the Bragg reflective condition. In this manner, the thermo optic device 110 is made tunable. Such a device will normally be operated in a steady state condition so that a single wavelength will satisfy the Bragg reflection condition over a given time interval.

With reference to FIGS. 1C and 1D, a portion of the thermo optic device 110 is shown in greater detail. In particular, the heater 120 is formed with contacts 121, 123 and conductors 131, 133 to, ultimately, connect to the control element during use.

Unfortunately, the heater 120, together with its associated contacts 121, 123 and conductors 131, 133, requires three fabrication masking steps to form with conventional processes, i.e., one masking step to form the heater, one to form the contacts, and one to form the conductors. This unnecessarily complicates manufacturing and wastes resources and finances.

Accordingly, the thermo optic arts desire improved heaters that are cheaper and quicker to produce, e.g., formed by fewer mask counts, without any corresponding sacrifice in quality, reliability or longevity.

SUMMARY OF THE INVENTION

The above-mentioned and other problems become solved by applying the apparatus and method principles and teachings associated with the hereinafter described resistive heater for thermo optic device.

In one embodiment the resistive heater is formed on a surface of a grating of a thermo optic device in two mask counts thereby eliminating one mask count from prior art manufacturing methods. In particular, the resistive heater is comprised of a heater region and a conductive path region formed together in a first mask count from a relatively high resistance material. A conductor, formed from a relatively low resistance material, is formed directly on the conductive path region in a second mask count. Advantageously, manufacturing processes can now be simpler and resource waste can be eliminated.

Thermo optic devices formed by these two mask count methods are also described.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 6A and 6B are planar views of a plurality of grouped resistive heaters in accordance with the teachings of the present invention;

FIG. 6C is a planar view of a plurality of cascaded resistive heaters connected electrically in parallel in accordance with the teachings of the present invention;

DETAILED DESCRIPTION OF THE PREFERRED EMBODIMENTS

Figure 1A:
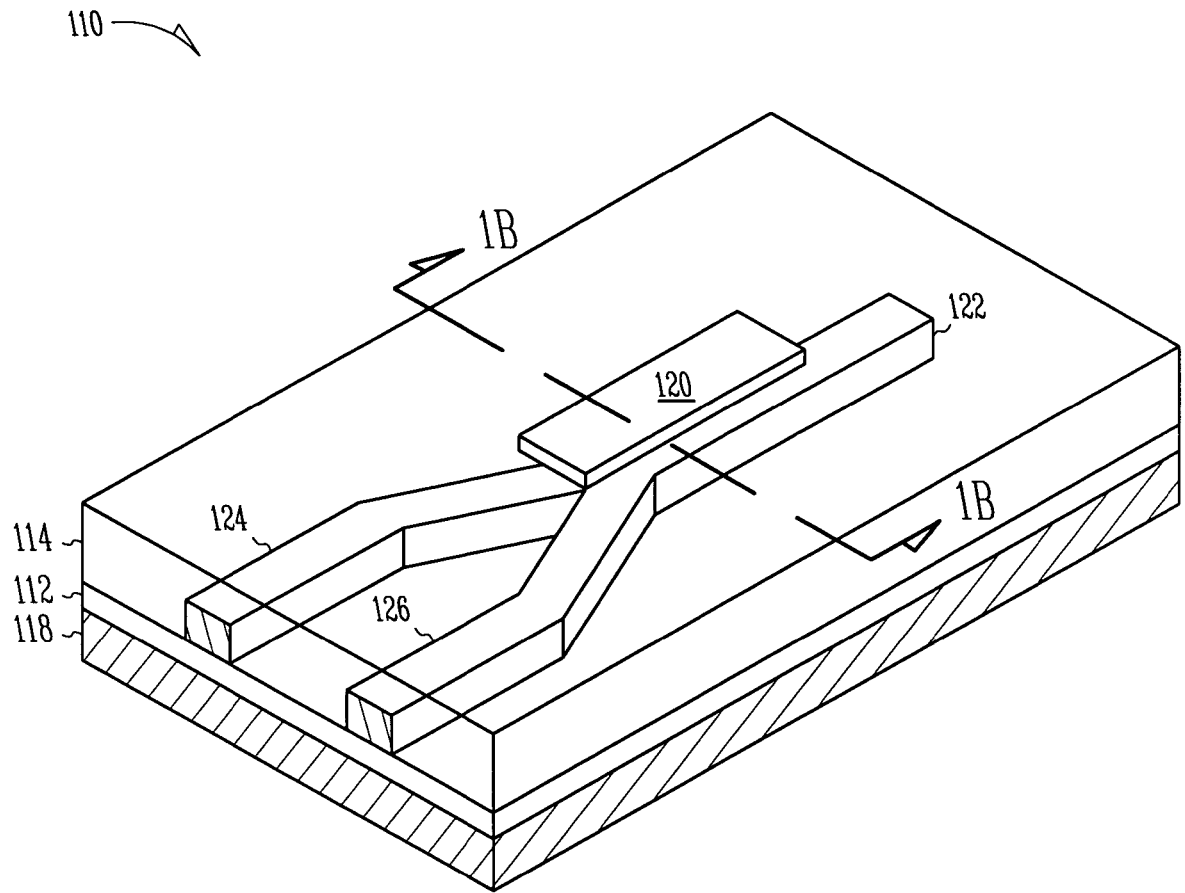
FIG. 1A is a perspective view of a thermo optic device having a Y-shaped optical waveguide in accordance with the prior art.
Figure 1B:
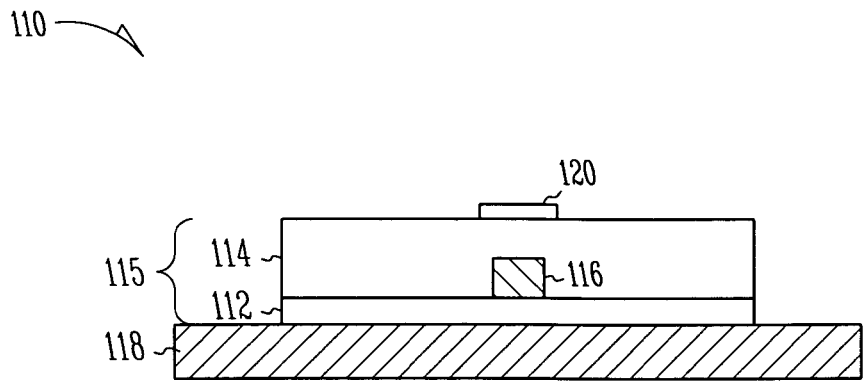
FIG. 1B is a cross sectional view of the thermo optic device of FIG. 1A taken along line 1B-1B.
Figure 1C:
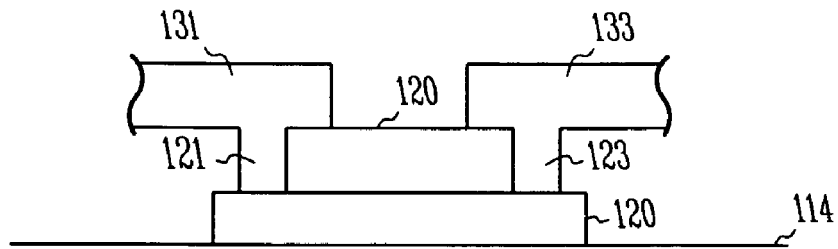
FIG. 1C is a more detailed cross sectional view of a heater of the thermo optic device of FIG. 1A.
Figure 1D:
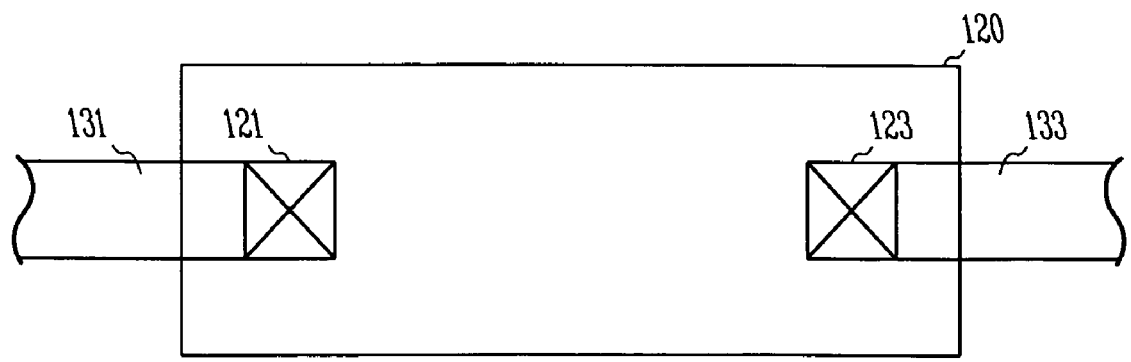
FIG. 1D is a planar view of the heater of FIG. 1C.

In the following detailed description of the preferred embodiments, reference is made to the accompanying drawings which form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical or mechanical changes may be made without departing from the scope of the present invention. As used herein, the term substrate includes any base semiconductor structure, such as silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. The following detailed description is, therefore, not to be taken in a limiting sense, and the scope of the present invention is defined only by the appended claims and their equivalents.

The following description and figures use a reference numeral convention where the first digit of the reference numeral corresponds to the figure and the following two digits correspond to like elements throughout the specification. For example, the grating of a thermo optic device of the present invention has a reference number of 200, 300, 400, etc. corresponding to the grating X00 in FIGS. 2, 3, 4, etc., where X is the number of the figure in which the reference numeral appears.

Figure 2A:
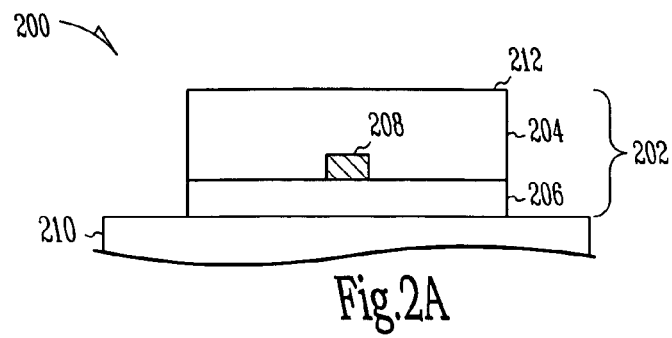
FIG. 2A is a cross sectional view of a grating upon which a resistive heater in accordance with the teachings of the present invention will be formed.

A resistive heater for use with a thermo optic device will now be described that, advantageously, has less mask counts than any prior art heaters. With reference to FIG. 2A, a thermo optic grating in accordance with the present invention is shown generally as 200. The grating 200 comprises a cladding 202 and a core layer 208. It is formed on a substrate 210 preferably formed of silicon. The substrate, however, could be any variety of well known materials for supporting a thermo optic grating.

The cladding 202 includes an upper cladding 204 and a lower cladding 206 that define the shape of the core layer 208. The materials selected for the cladding 202 and core layer 208 are selected in such a way that they have different indices of refraction, either higher or lower than one another. As is known, the core layer acts to propagate light by reflecting light at the boundaries between the core layer and the cladding. In a preferred embodiment, the upper and lower claddings 204, 206 are formed of silicon oxides while the core layer is formed of a silicon oxynitride.

The core layer, in one embodiment, forms an optical waveguide. It could be similar in shape to the Y-shaped optical waveguide with an input and two output waveguides as shown in FIG. 1A. It could also be an X-shaped waveguide, a continually shaped section of waveguide, or other waveguide structure now known or hereinafter developed.

In one embodiment, the grating is formed by depositing the lower cladding, depositing the core layer, photo patterning the core layer, etching the core layer and depositing the upper cladding. In another embodiment, the lower cladding 206 is a grown layer with the core layer and upper cladding being formed in the same manner.

Preferred deposition techniques for these, and after described layers include, but are not limited to, any variety of chemical vapor depositions (CVD), physical vapor depositions (PVD), epitaxy, evaporation, sputtering or other similarly known techniques. Preferred CVD techniques include low pressure (LP) ones, but could also be atmospheric pressure (AP), plasma enhanced (PE), high density plasma (HDP) or other. Preferred etching techniques include, but are not limited to, any variety of wet or dry etches, reactive ion etches, etc.

In the following figures, a resistive heater will be described that is formed on a surface 212 of the grating 200. It will be appreciated that this surface 212 is the top of the upper cladding 204.

Figure 2B:
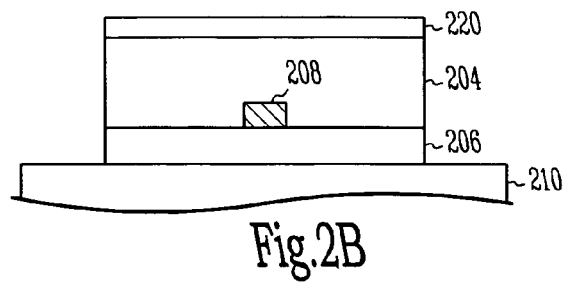
FIG. 2B is a cross sectional view in accordance with the teachings of the present invention of a first layer deposited upon the grating of FIG. 2A.

In a first step after formation of the grating 200, a first layer 220 is deposited on surface 212 as shown in FIG. 2B. Preferably, the first layer is a poly silicon layer. Even more preferably, it is a poly silicon layer doped with an impurity such as arsenic, phosphorous or boron. In one embodiment, the first layer is a phosphorous doped poly silicon having a resistance of about 40 $\Omega/cm^2$. The first layer, however, only needs to be a material that has a relatively high resistance. As will be described later, the first layer will form a heater region portion of the resistive heater and needs to resist current flow and produce heat. Accordingly, the first layer could be any variety of other relatively high resistance materials, such as representative chromium, indium or other silicon arranged materials.

In one embodiment, the thickness of the first layer is deposited to a thickness of at least about 100 Å thick. In another embodiment, the thickness is about 4000 Å of the phosphorous doped poly silicon. The thickness is primarily dictated according to the heating requirements of the thermo optic device. Thicker depositions provide more heating capabilities while thinner depositions provide less. The deposition technique for the first layer is LPCVD but could be any of the other foregoing described techniques.

Figure 2C:
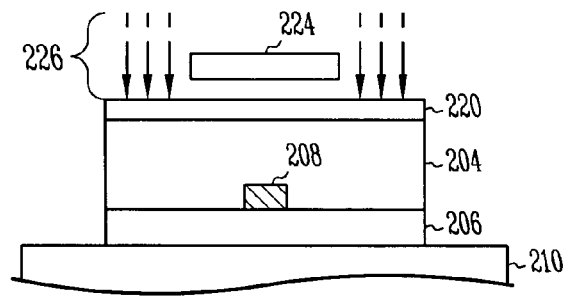
FIG. 2C is a cross sectional view in accordance with the teachings of the present invention of a first mask used upon the first layer of FIG. 2B.

With reference to FIG. 2C, the first layer 220 is acted upon in a photomasking step. The first layer is masked with a first mask 224 (mask count 1) and a portion thereof is photo impacted 226. In this embodiment, the photo impacting is accomplished with an ultraviolet light from a photolithography device well known to those skilled in the art. The photo impacting, however, should not be limited to such an embodiment and may alternatively include X-rays or other light sources.

Figure 2D:
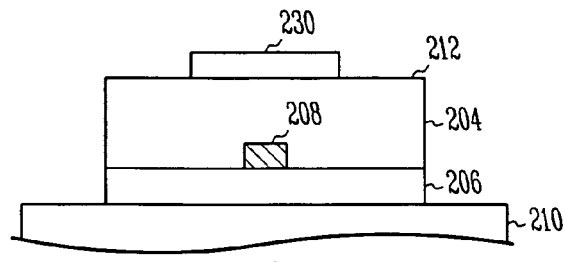
FIG. 2D is a cross sectional view in accordance with the teachings of the present invention of a patterned first layer formed after the first mask application of FIG. 2C.

Thereafter, the photo impacted first layer is etched so that a patterned first layer 230 on surface 212 of the grating remains as shown in FIG. 2D. In one embodiment, the etch is a reactive ion etch with a plasma containing fluorinated chlorine. The etch, however, could be any well known etch described above or any etch hereinafter developed.

As depicted, it will be appreciated that the patterned first layer 230 is a photomasking island, but could have been produced as a photomasking hole. The particular embodiment, island or hole, depends upon whether the configuration of the first mask is a clear-field or dark-field mask as those terms as well understood in the art. In either event, both embodiments are embraced by the scope of this invention.

Figure 3A:
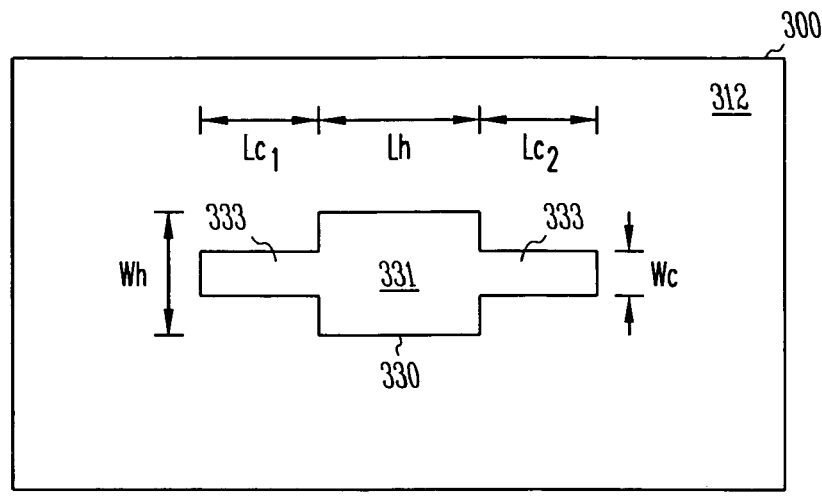
FIG. 3A is a planar view of a representative embodiment of a patterned first layer in accordance with the teachings of the present invention.

With reference to FIG. 3A, a representative patterned first layer 330 is shown in a top-down planar view as it is formed on surface 312 of grating 300 after the process step shown in FIG. 2D. In this embodiment, the patterned first layer comprises a heater region 331 and a conductive path region 333 on either sides thereof.

In the embodiment shown, the heater region 331 has planar dimensions Lh×Wh, with L being length, W being width, and h being the heater region. These dimensions are of no particular size provided they fit within the geographic confines of surface 312 of grating 300. The size is dictated by how much heat is required by the thermo optic device during use.

In a similar manner, the dimensions $L_{C1} \times W_C$ and $L_{C2} \times W_C$, where subscript C is the conductive path region and subscript 1 is the left and 2 is the right conductive path regions, respectively, are not of a particular size. In fact, the dimensions of both conductive path regions could be the same or very dissimilar to one another or the heater region. The size of the conductive path regions is a function of design according to many parameters such as where the heater region is to be connected to an external control system for the delivery of current, how much current is to flow, etc.

The shapes of both the heater region and the conductive path regions, while shown as generally rectangular, could be circular, serpentine, polygonal, triangular, square, or any other geometric shape(s) that could be fabricated with the first mask. As is taught herein, the size and dimension is a function of, among other things, how much heat is required to be generated by the heater region.

Even further, the planar (x-y plane) positioning of the patterned first layer, including the heater region and conductive path regions, as it is formed on surface 312 is similarly a function of the thermo optic device and in what application the thermo optic device will be used.

Figure 4A:
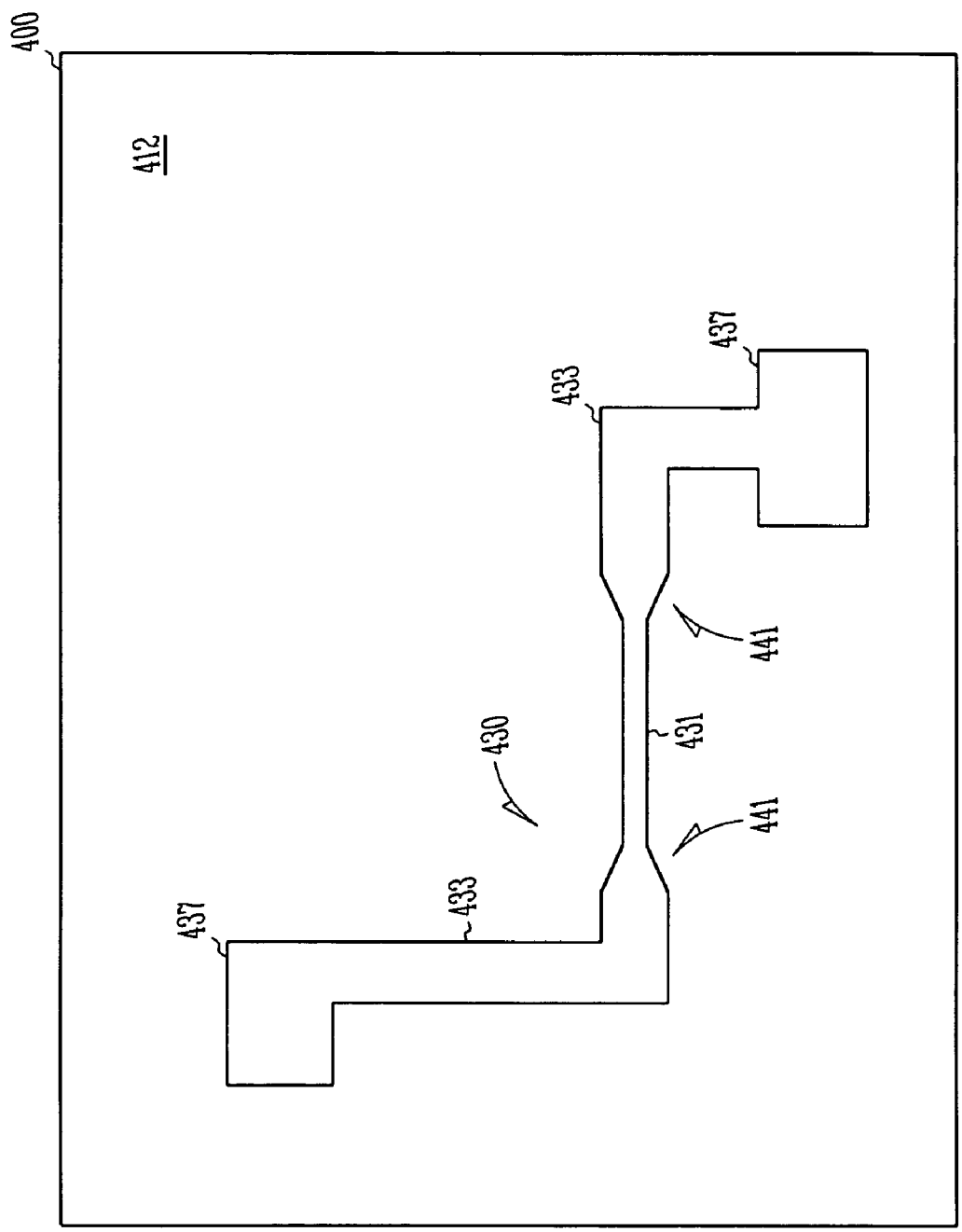
FIG. 4A is a planar view of another representative embodiment of a patterned first layer in accordance with the teachings of the present invention.

Accordingly, another representative embodiment of a patterned first layer 430 with a heater region 431 and conductive path regions 433 on a surface 412 of a grating 400 is shown in FIG. 4A. In this Figure, the heater region is formed between the conductive path regions with neck down areas 441 to depict a much smaller heater region in comparison to the conductive path regions. Bond pad regions 437 are also formed to, ultimately, facilitate electrical connection the heater region 431. Again, no particular, size, shape, positioning of the patterned first layer is required and all embodiments are embraced herein.

In all figures, it should be appreciated that both the heater and conductive path regions are formed of the relatively high resistance material in a first mask count even though the heater and conductive path regions have different functions as will be described subsequently.

Figure 2E:
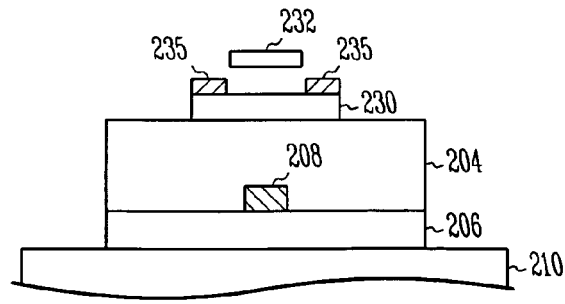
FIG. 2E is a cross sectional view in accordance with the teachings of the present invention of a second mask used upon the patterned first layer of FIG. 2D.
Figure 3B:
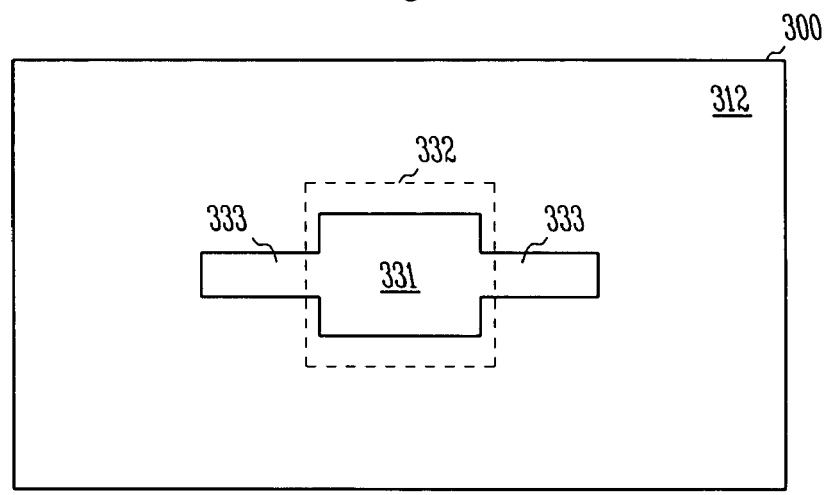
FIG. 3B is a planar view in accordance with the teachings of the present invention of a second mask used upon the representative embodiment of the patterned first layer of FIG. 3A.

With reference to FIG. 2E, in another photomasking step, a second mask 232 (mask count 2) is arranged with respect to the patterned first layer 230 to isolate the heater region from the conductive path regions. In FIG. 3B, the second mask 332 is exaggeratedly shown over heater region 331 to isolate the heater region from each of the conductive path regions 333 on either side thereof. Like the first mask, the second mask can be configured as a clear-field or dark-field mask to isolate the heater region from the conductive path region and both embodiments are embraced herein.

Thereafter, the areas of the conductive path regions are plated with a relatively low resistance material to form conductors 235 as shown in FIG. 2E.

In a preferred embodiment, the conductive path regions are electroless plated with nickel by submergence of at least the conductive path regions in a liquid bath. In another embodiment, the conductors 235 are formed with any of tungsten, titanium, tantalum, molybdenum or cobalt. In still another embodiment, multiple layer stacks such as TiSix/TiN/W may be used to reduce contact resistance between conductor and heater layers. The material selected for the conductors, it should be appreciated, need only be a material having a relatively low resistance so that current can flow relatively well. As such, still other metals, combinations of metals or other materials can be used in forming the conductors.

Figure 3C:
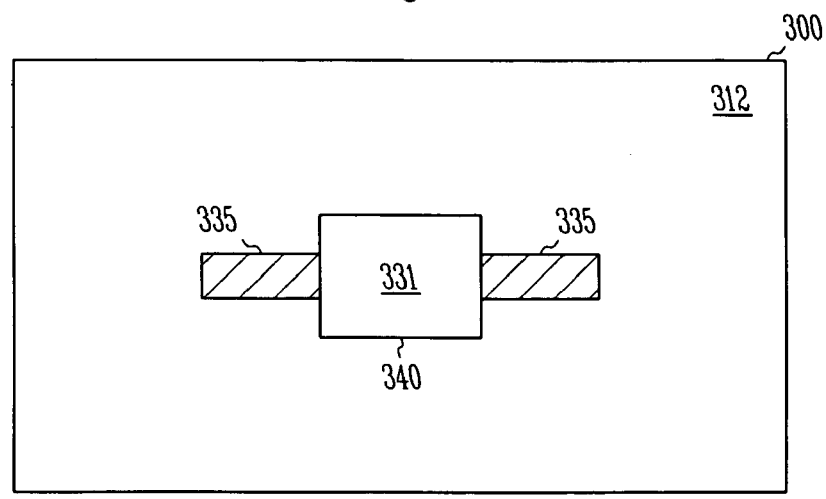
FIG. 3C is a planar view of one embodiment of a resistive heater in accordance with the teachings of the present invention.

With reference to FIG. 3C, a representative resistive heater in accordance with the present invention is shown generally as 340. It comprises a heater region 331 and conductors 335 formed over the conductive path regions. The resistive heater is formed on surface 312 of grating 300 of a thermo optic device.

Figure 4B:
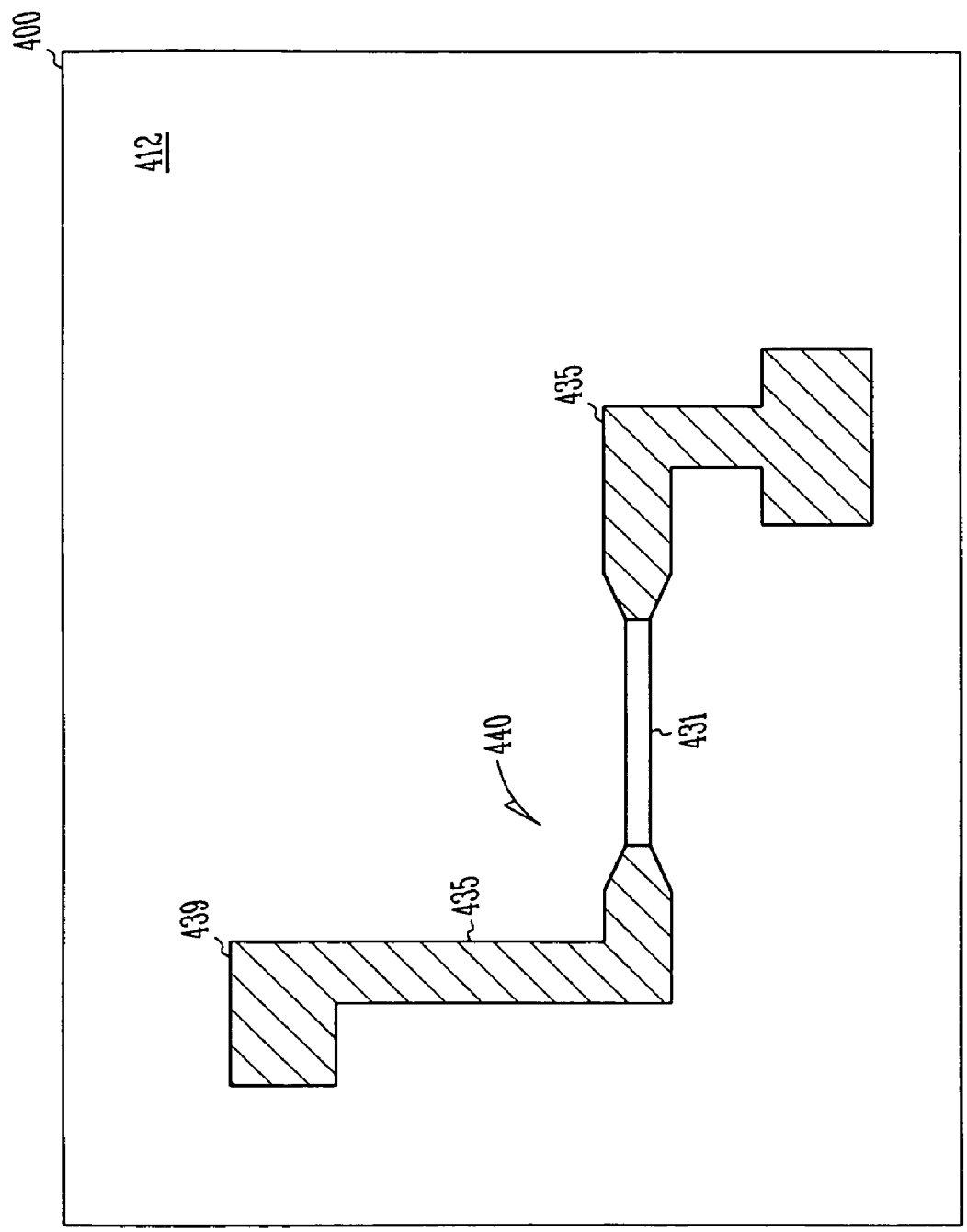
FIG. 4B is a planar view of another embodiment of a resistive heater in accordance with the teachings of the present invention.

In FIG. 4B, the representative resistive heater of the present invention is shown generally as 440. It includes a heater region 431 and conductors 435 formed over conductive path regions 433 (FIG. 4A). The bond pad regions 437, after plating, form bond pads 439. As with the other embodiments, the resistive heater 440 is formed on surface 412 of grating 400 of a thermo optic device, which in turn, is formed on a substrate.

It will be appreciated that the foregoing described resistive heater is formed with two mask counts which is at least one less mask count than any known prior heaters. Advantageously, the practice of this invention yields quicker formed resistive heaters for use with thermo optic devices. Since photomasking machinery, and therefore masking operations, is extremely expensive in relation to other types of process machines, such as CVD machines, the practicing of the present invention will also result in financial savings.

During use, the resistive heaters of the present invention are connected to a control element (perhaps via the bond pads) via the conductors to deliver current to the resistive heater to heat the thermo optic device thereby changing an optical characteristic thereof. It will be appreciated that the conductors will flow current because they are formed of low resistance material while the heater region will inhibit current flow because it is formed of a high resistance material. The heater region, in turn, will heat up the thermo optic grating while the conductors will not.

During use, the resistive heaters of the present invention may be used with thermo optic devices in a variety of applications. For example, the thermo optic device may be an amplifier, an optical waveguide, a switch, a modulator, or any other optical transmission device.

Figure 5B:
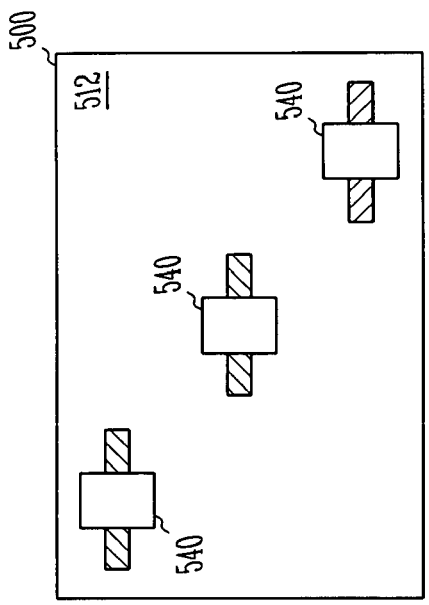
FIGS. 5A and 5B are planar views of a plurality of cascaded resistive heaters in accordance with the teachings of the present invention.
Figure 5C:
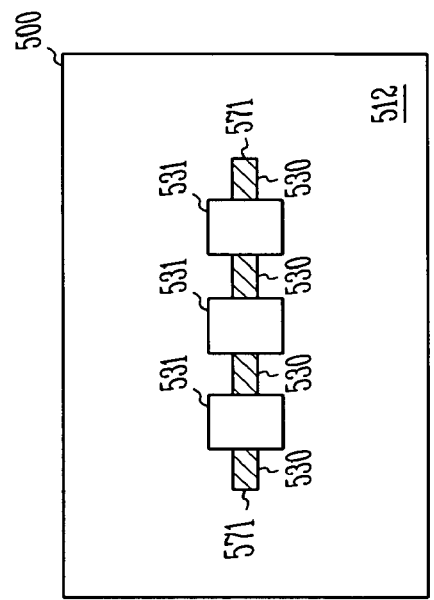
FIG. 5C is a planar view of a plurality of cascaded resistive heaters connected electrically in serial in accordance with the teachings of the present invention.
Figure 5A:
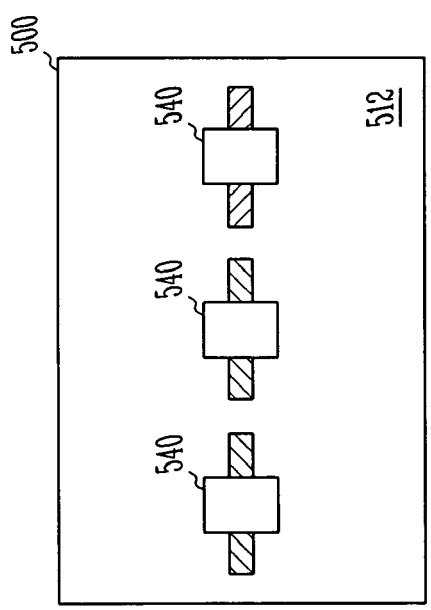

Heretofore, the resistive heaters of the present invention have been shown as singular resistive heater on a grating. The present invention also embraces pluralities of resistive heaters depending upon application requirements for heating a thermo optic device. For example, a plurality of resistive heaters 540 may be cascaded together across a surface 512 of grating 500 as shown in FIGS. 5A and 5B. In FIG. 5C, the cascaded resistive heaters are electrically connected in series across surface 512 of grating 500. In particular, a plurality of heater regions 531 are serially interconnected with a plurality of conductive path regions 530 on either side of each heater region. In this manner, a single control element may be connected to terminal ends 571 of the conductive path regions and thereby flow a single current through the plurality of heater regions 531 to heat them simultaneously. It will be appreciated that the heater regions, while shown as similar devices, may all individually have unique shapes and sizes thereby being capable of delivering various dissimilar regions of heating to the thermo optic device during use.

Alternatively, the resistive heaters of the present invention may be arranged as rows or groupings of resistive heaters 640 in rows A or B on surface 612 of grating 600 in FIG. 6. In FIG. 6C, the row A of resistive heaters are electrically connected in parallel. In particular, a plurality of heater regions 631 each having a conductive path region 630 on either side thereof is electrically connected in parallel via a plurality of inter-bridging conductive paths 673 having substantially the same electrical resistance as the conductive path regions. In this manner, a single control element may be connected to terminal ends 671 of the conductive path regions and thereby flow a plurality of currents through the plurality of heater regions 631 to heat them simultaneously. It will be appreciated that the heater regions, while shown as similar devices, may all individually have unique shapes and sizes thereby being capable of delivering various dissimilar regions of heating to the thermo optic device during use.

Those skilled can envision still other arrangements of resistive heaters formed in accordance with the teachings of this invention without departing from the spirit or scope of the defined claims.

It will be appreciated that during use, the resistive heaters of the present invention may be used with thermo optic devices in a variety of applications. For example, the thermo optic device may be an amplifier, modulator, gate, filter, time delay element, switch, multiplexer, or other.

Figure 7:
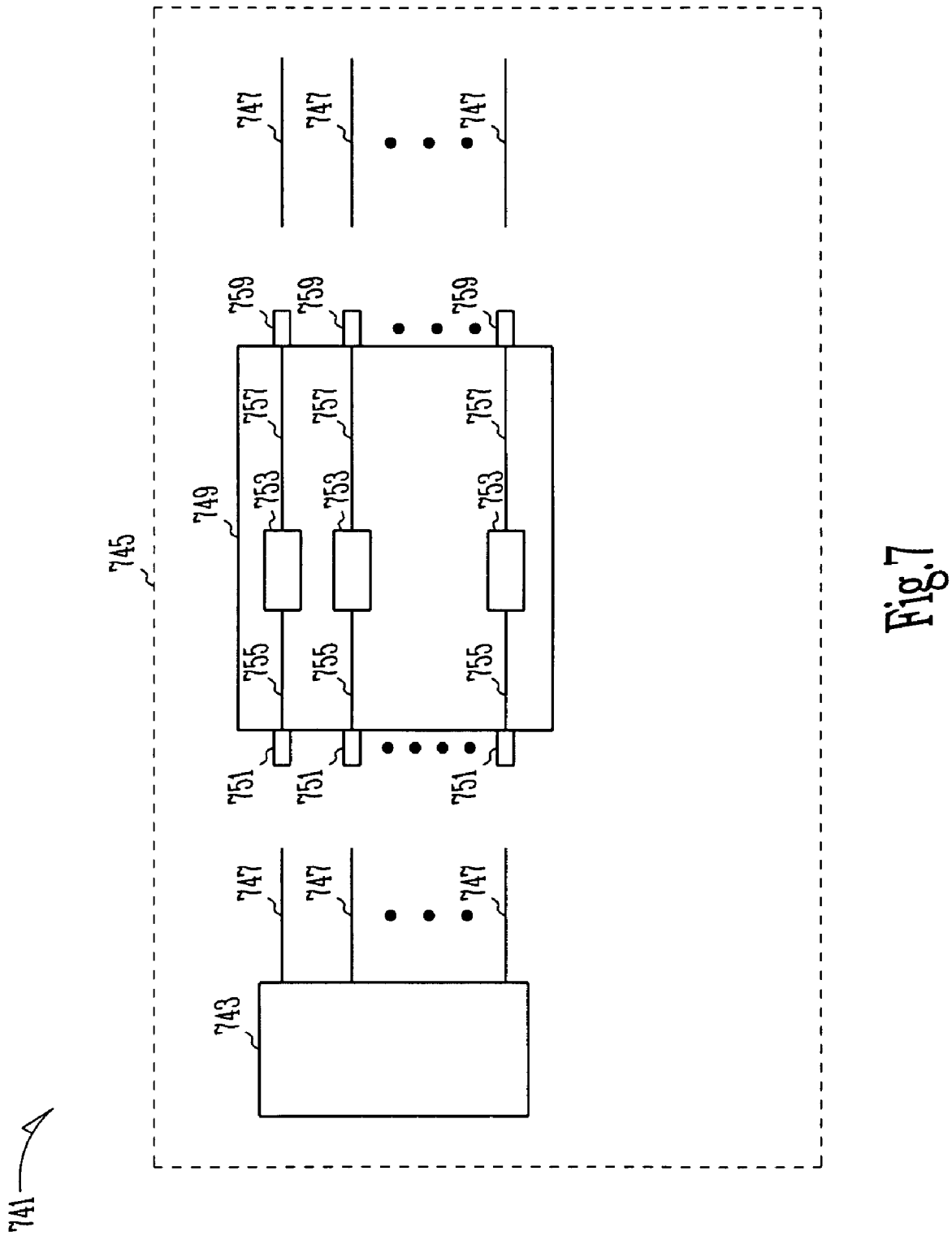
FIG. 7 is a block diagram of a system having a thermo optic package comprising resistive heaters formed in accordance with the teachings of the present invention.

With reference to FIG. 7, a system, having as part thereof a resistive heater formed in accordance with the teachings of the present invention, is shown generally as 741. The system may be an exclusively fiber optic system or may be a system having other software and hardware devices, as indicated by the dashed line 745, operably coupled to at least one fiber optic component thereof.

In either system, a light source 743 will be provided as the source for propagating light signals along at least one fiber optic line 747. Well known light sources include, but are not limited to, laser light sources. In the embodiment shown, the system 741 includes a plurality of fiber optic lines 747.

Coupleable to the fiber optic lines via a plurality of input fiber optic ports 751 is a thermo optic package 749. Contained within the thermo optic package is at least one thermo optic device 753 having at least one resistive heater formed in accordance with the present invention. In the embodiment shown, the thermo optic device 753 is coupled to the input fiber optic port 751 via an input connector 755 while an output connector 757 couples the thermo optic device to an output fiber optic port 759. In turn, the output fiber optic port 759 is coupled to another fiber optic line 747 of system 741.

During use, a system user merely needs to couple fiber optic lines 747 to the input and output fiber optic ports of the package 749 to readily achieve a thermo optic device having the advantages offered by the resistive heaters of the present invention.

Figure 8:
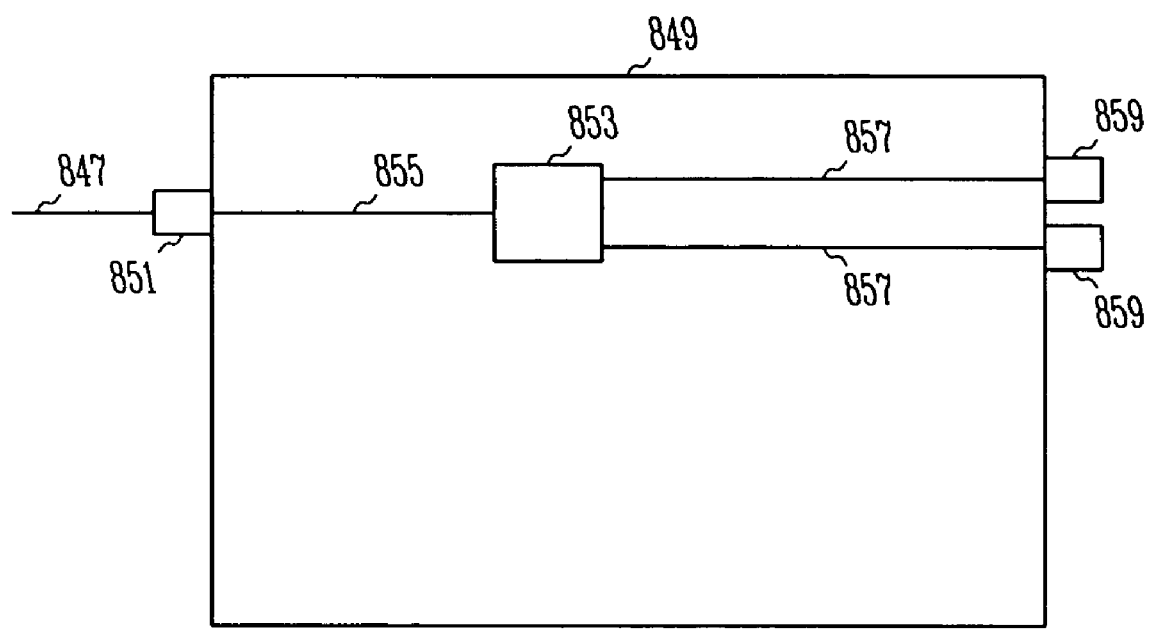
FIG. 8 is an alternative embodiment of a thermo optic package comprising resistive heaters formed in accordance with the teachings of the present invention.

With reference to FIG. 8, an alternative embodiment of a thermo optic package 849 is shown having a thermo optic device 853 with a single input connector 855 and a plurality of output connectors 857. The input connector 855 connects with input fiber optic port 851 which is readily matable with a fiber optic line 847 of a system. The output connectors 857 of thermo optic device 853 are each matable with an output fiber optic port 859.

In another embodiment, the single input connector of the thermo optic device 853, having a resistive heater formed in accordance with the present invention, may alternatively be replaced with two or more input connectors while the two output connectors may be replaced with one or more output connectors depending upon the type and desired use of the thermo optic device 853.

CONCLUSION

The above structures and fabrication methods have been described, by way of example, and not by way of limitation, with respect to resistive heaters for thermo optic devices.

In particular, resistive heaters formed in two mask counts on a surface of a grating of a thermo optic device have been described that eliminate at least one mask count from prior art manufacturing methods. The resistive heater is comprised of a heater region and a conductive path region formed together in a first mask count from a relatively high resistance material. A conductor formed from a relatively low resistance material is formed directly on the conductive path region in a second mask count. Thermo optic devices formed by these two mask count methods are also described.

As a result, resistive heaters of this invention can be formed quicker and cheaper without any corresponding sacrifice in quality, reliability or longevity.

The present invention has been particularly shown and described with respect to certain preferred embodiment(s). However, it will be readily apparent to those of ordinary skill in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. An apparatus, comprising:
   a grating having a surface; and
   a resistive heater on the surface, the resistive heater being formed with less than three mask counts, the resistive heater including conductive path regions, a heater region between the conductive path regions, and a conductor disposed on the conductive path regions of the resistive heater, wherein a resistance of the heater region has a resistance value different from a resistance value of a resistance of the conductor, wherein the resistive heater has a thickness of at least 100 Angstroms.

2. The apparatus of claim 1, wherein the resistance value of the resistance of the heater region is at least 40 $\Omega/cm^2$.

3. The apparatus of claim 1, wherein a material of the heater region of the resistive heater includes poly silicon.

4. The apparatus of claim 1, wherein the resistive heater is constructed without having a contact between the heater region and the conductor.

5. The apparatus of claim 4, wherein the conductor includes a first mask conductive path region in electrical contact with the heater region.

6. The apparatus of claim 5, wherein the conductor includes a second mask conductor formed over the first mask conductive path region.

7. The apparatus of claim 6, wherein the heater region is rectangular.

8. An apparatus, comprising:
   a grating having a surface;
   a layer including a heater region and a conductive path region on the surface, the layer including a single horizontal surface, the heater region including a single horizontal surface, the conductive path region including a single horizontal surface, wherein the single horizontal surface of the heater region and the single horizontal surface of the conductive path region are parts of the single horizontal surface of the layer, wherein the heater region and the conductive path region include a high resistance material for resisting a current delivered to the heater region via the conductor such that a flow of the current in the conductor is different from a flow of the current in the heater region, further wherein the high resistance material is one of chromium, indium and silicon; and a conductor, the conductor being formed on the conductive path region, wherein the heater region and the conductor are formed with only two mask counts, wherein the conductor contacts the heater region directly at the conductive path region, and wherein the conductor contacts the heater region only at the conductive path region.

9. The apparatus of claim 8, wherein the conductor includes a low resistance material, and wherein the low resistance material has a resistance value less than a resistance value of the high resistance material.

10. The apparatus of claim 9, wherein the low resistance material is one of tungsten, titanium, tantalum, cobalt, nickel, and molybdenum.

11. A thermo optic apparatus, comprising:
a cladding;
a core layer;
a high resistance material on the cladding having a heater region and an adjacent conductive path region; and
a low resistance material on the conductive path region, wherein the high and low resistance materials form a resistive heater, the resistive heater being formed with exactly two mask counts, wherein the resistive heater is directly above at least a portion of the core layer, and wherein a resistance value of the high resistance material is greater than a resistance value of the low resistance material, further wherein the high resistance material has an electrical resistance of at least 40 $\Omega/cm^2$.

12. The apparatus of claim 11, wherein the high resistive material is on a surface of an upper cladding of the cladding.

13. The apparatus of claim 12, wherein the upper cladding is an oxide.

14. The apparatus of claim 11, wherein the core layer is an optical waveguide having an input waveguide and two output waveguides.

15. A thermo optic device, comprising:
a grating having a surface; and
a plurality of resistive heaters on the surface, the resistive heaters being formed with less than three mask counts, at least one of the resistive heaters including conductive path regions, a heater region between the conductive path regions, and a conductor disposed on the conductive path regions of the resistive heater, wherein a resistance of the heater region has a resistance value greater than a resistance value of a resistance of the conductor, further wherein the plurality of resistive heaters are cascaded together across the surface.

16. The device of claim 15, wherein the plurality of resistive heaters are grouped together in a plurality of rows.

17. A thermo optic device, comprising:
a grating having a surface; and
a plurality of resistive heaters on the surface, at least one of the resistive heaters including conductive path regions, a heater region between the conductive path regions, and a conductor disposed on the conductive path regions of the resistive heater, wherein a resistance of the heater region has a resistance value different from a resistance value of a resistance of the conductor, further wherein the plurality of resistive heaters are cascaded together across the surface.

18. The device of claim 17, wherein the plurality of resistive heaters are grouped together in a plurality of rows.

19. An apparatus, comprising:
a grating having a surface; and
a resistive heater on the surface, the resistive heater being formed with less than three mask counts, the resistive heater including conductive path regions, a heater region between the conductive path regions, and a conductor disposed on the conductive path regions of the resistive heater, wherein a resistance of the heater region has a resistance value different from a resistance value of a resistance of the conductor, further wherein the resistance value of the resistance of the heater region is at least 40 $\Omega/cm^2$.

20. The apparatus of claim 19, wherein the resistive heater is constructed without having a contact between the heater region and the conductor.

21. The apparatus of claim 19, wherein the resistive heater has a thickness of at least 100 Angstroms.

22. The apparatus of claim 19, wherein a material of the heater region of the resistive heater includes poly silicon.

23. The apparatus of claim 20, wherein the conductor includes a first mask conductive path region in electrical contact with the heater region.

24. The apparatus of claim 23, wherein the conductor includes a second mask conductor formed over the first mask conductive path region.

25. The apparatus of claim 24, wherein the heater region is rectangular.

26. An apparatus, comprising:
a grating having a surface; and
a resistive heater on the surface, the resistive heater being formed with less than three mask counts, the resistive heater including conductive path regions, a heater region between the conductive path regions, and a conductor disposed on the conductive path regions of the resistive heater, wherein a resistance of the heater region has a resistance value different from a resistance value of a resistance of the conductor, further wherein a material of the heater region of the resistive heater includes poly silicon.

27. The apparatus of claim 26, wherein the resistive heater is constructed without having a contact between the heater region and the conductor.

28. The apparatus of claim 26, wherein the resistive heater has a thickness of at least 100 Angstroms.

29. The apparatus of claim 26, wherein the resistance value of the resistance of the heater region is at least 40 $\Omega/cm^2$.

30. The apparatus of claim 24, wherein the conductor includes a first mask conductive path region in electrical contact with the heater region.

31. The apparatus of claim 30, wherein the conductor includes a second mask conductor formed over the first mask conductive path region.

32. The apparatus of claim 31, wherein the heater region is rectangular.

* * * * *